United States Patent [19]

Rudolph et al.

[11] 4,150,161

[45] Apr. 17, 1979

[54] CARBONATED CHEWING GUM

[75] Inventors: Marvin J. Rudolph, Bethel; Richard B. Hynson, New Fairfield, both of Conn.

[73] Assignee: General Foods Corporation, White Plains, N.Y.

[21] Appl. No.: 777,797

[22] Filed: Mar. 15, 1977

[51] Int. Cl.² ............................ A23G 3/30; A23G 3/00
[52] U.S. Cl. ................................................ 426/3; 426/5; 426/660
[58] Field of Search .................. 426/3, 4, 5, 6, 660

[56] References Cited

U.S. PATENT DOCUMENTS

| | | | |
|---|---|---|---|
| 2,197,919 | 4/1940 | Bowman | 426/4 |
| 2,460,698 | 2/1949 | Lindke | 426/5 |
| 3,012,893 | 12/1961 | Kremzner et al. | 426/660 |

Primary Examiner—Jeanette M. Hunter
Attorney, Agent, or Firm—Richard Kornutik

[57] ABSTRACT

This invention relates to a two component confection having a carbonated candy component and a pliable bubble gum component with each component having a controlled water activity between 0.10 to 0.30 which is capable of surviving long periods of storage when packaged in a moisture resistant material.

9 Claims, No Drawings

CARBONATED CHEWING GUM

BACKGROUND OF THE INVENTION

Carbonated candy is a hard candy containing carbon dioxide gas as disclosed in U.S. Pat. No. 3,012,893 which is herein incorporated by reference. Such a candy is made by the process which comprises melting crystalline sugar, contacting such sugar with gas at a pressure of 50 to 1,000 psig for a time sufficient to permit adsorption in said sugar of 0.5 to 15 ml of gas per gram of sugar, maintaining the temperature of said sugar during said adsorption above the solidification temperature of the melted sugar, and cooling said sugar under pressure to produce a solid amorphous sugar containing the gas.

The resultant product contains 1% to 5% water and most typically 2% to 3% water by weight of the total composition. Lower levels of moisture are not practicably obtainable because the additional heat necessary to drive off the water causes the candy melt to caramelize or burn, resulting in an off-flavor, undesirable product. Higher moisture levels result in a soft, sticky matrix which rapidly liberates the entrapped gas and is thus not storage stable. It has been found that the water activity of the product made according to the above patent is between about 0.10 to about 0.30. Additionally, the candy glass, in order to maintain storage stability, must be isolated from any source of free water and is thus packaged in a moisture resistant container. Free water softens the candy allowing the trapped gas to escape.

The Carbonated candy when placed in the mouth produces an entertaining but short lived popping sensation. As the candy is wetted in the mouth the candy melts and the carbon dioxide escapes. The effect in the mouth is sensational but short.

Conventional chewing gums are available in a variety of forms. The gum base may be any chewable substantially water insoluble base such as chicle and substitutes thereof, sorva, guttakay, jelutong, synthetic polymers such as polyvinyl acetate, synthetic resins rubbers, mixtures of these and the like. The percentage of gum base employed in chewing gums may vary widely according to the type used and other ingredients employed and whether the final product is a "stick" chewing gum or a "bubble" gum or dragée. Minor amounts of plasticizers or softeners may also be incorporated in the gum base.

Flavors generally employed in the preparation of flavored chewing gums are the essential oils of synthetic flavorings used either singly or in combination with other natural and synthetic oils. Flavors such as wintergreen, spearmint, peppermint, birch, anise fruit flavors, mixtures thereof and the like may be used satisfactorily with a variety of gum bases. The amount of flavoring material used will vary depending on the type used, individual taste preferences, the gum base employed and other such considerations.

The sweetener or sweeteners added to complete the chewing gum composition categorize the gum as either a sugarless or a sugar gum. Sugar gum is intended to include not only sucrose but also the other sugarlike sweeteners normally employed in chewing gums such as dextrose, glucose (corn syrup), fructose and the like and mixtures thereof. Sugarless gums normally include synthetic sweetening agent such as saccharin or cyclamate or salts thereof and/or the dipeptide sweetening agents dihydrochalcones and the like or mixtures thereof combined with a sugar alcohol such as sorbitol and mannitol. Where the sugar alcohol has a sweetness intensity near sucrose, such as xylitol, then synthetic sweetener may be dispensed with.

The gums are conventionally prepared by mixing heated chewing gum base and sweetening agents such as sucrose as an aqueous sugar syrup or in the case of sugarless chewing gums an aqueous sugar alcohol solution plasticizers and flavor. These aqueous solutions typically contain 15% to 70% water. The resultant product contains from 1% to 5% by weight of moisture. Such moisture levels are required to render conventional gum pliable. At lower moisture the gum becomes hard and brittle. Additionally in order to preserve the moisture content of the gum, each piece is enveloped with at least one protective wrapper.

The water activity of conventional chewing gums is typically about 0.35 to about 0.60. The sugar and sugar alcohols in conventional chewing gum remain crystalline in form. Thus, the moisture content of conventional gum exists essentially as free water, being absorbed on the surface of sugar or sugar alcohol crystals. This is contrasted with the moisture existing in amorphous carbonated candy which is bound within the structure and has a substantially lower water activity.

When conventional chewing gum containing 1-5% water contacts or is packaged with carbonated candy, the water migrates from the gum to the candy and the candy becomes sticky and loses its characteristic pop and sizzle while at the same time the gum becomes hard and stale.

U.S. Pat. No. 3,262,784 to Fleer (Bucher) discloses a low moisture chewing gum. Such a gum is a crumbly friable material and resembles sand or powdered sugar at room temperature. The crystalline sugar component has a low moisture content well below 1%. The gum base is dry. While the Fleer patent discloses gum base proportions to 40%, the bubble gum is usually between about 5% to about 27% for sugar alcohol gums and 6% to 25% when sucrose is used.

SUMMARY OF THE INVENTION

This invention provides for a two component confection with each component having a water activity of about 0.10 to about 0.30 which is capable of surviving long periods of storage when packaged in a moisture resistant material. These components are gum and carbonated candy. The gum portion is preferably a sugar or sugarless bubble gum with a gum base content of at least 28% by weight of the total gum composition whereby the gum is pliable at room temperature. The carbonated candy portion of the confection comprises amorphous candy glass having a moisture content of 1½ to 5% water which has contained therein 0.05 to 15 milliliters of a gas, preferably carbon dioxide in each gram of composition. The water activity of the gum portion is substantially identical or becomes substantially identical on storage to the carbonated candy portion to minimize moisture transfer between each component when they are co-packed in a moisture resistant environment. Products can be formulated that are sugar based, sugarless using sugar alcohols in both gum and candy or combinations of sugar gum and sugar alcohol based candy or sugar alcohol gum and sugar based candy. Sucrose based gum and candy are preferred, but good sugarless products using a sugar alcohol gum and candy may be formulated.

DETAILED DESCRIPTION OF THE INVENTION

In the preferred embodiment of the instant invention, the gum portion of the confection is a sugar containing bubble gum. It will be readily apparent to those skilled in the art that a variety of gum types are readily adaptable to the practice of this invention. Commercially available conventional bubble gums generally have a base content of between about 10% to about 15% and in some cases as high as 18%. Those skilled in the art have heretofore considered the above amounts as the limits of the percentage of gum base in a bubble gum product.

Conventional bubble gum is normally formulated to have a final moisture content of 1% to 5%. Said moisture allows the gum to be pliable at room temperature. However, to insure that this moisture stays within the gum, the product is generally protected by several layers of packaging material. It is this moisture content which makes conventional gums incompatible with carbonated candy. This is because the sugar or sugar alcohols in the gums are crystalline in structure so that the water content therein or adsorbed therein, exists essentially as free water. Therefore the water activity of conventional gums is typically above 0.3 to about 0.5. Any substantial reduction in the moisture content of the conventional gum to attempt to make it compatible with carbonated candy, said candy having a water activity of from about 0.10 to about 0.30 results in a dry or stale gum.

Attempts to reduce the water activity of conventional gum by the addition of water activity depressants have not met with success. A typical depressant is glycerol. However, the amount of glycerol necessary to reduce 2.5% moisture gum having a water activity of 0.56 to a water activity value of 0.2 would be an amount of glycerol greater than 50% by weight of the total gum composition. Such an amount of glycerol would render the gum a liquid and therefore be not acceptable. Thus the instant invention, by using amounts of gum base higher than ordinarily employed by the prior art, allows the formulation of chewing gums which have a water activity identical to carbonated candy and still retain the desirable characteristics of cohesive pliability at room temperature.

The gum component is produced by combining component ingredients in a mixing vessel at temperatures between about 50° C. to about 70° C. and preferably between about 60° C. to about 65° C. When the ingredients are completely mixed, the warm gum is preferably next extruded into strands with diameters between 1/32 inch and ½ inch and preferably between 1/16 inch and ¼ inch in diameter and most preferably 3/16 inch diameter. The strands are then cooled and treated to provide fragments. Depending on the particle size desired, the resultant pieces are passed through various sieves. The preferable particle sizes utilized are between −4 and +12 mesh (U.S. Standard Sieves). The pieces are then allowed to equilibrate to room temperature. Any moisture present during cooling can be removed by conventional means.

Conventional gums include water in their formulation obtained typically from corn syrup or sorbitol solution in amounts of 1% to 5% by weight of the total gum composition. According to the instant invention, no water is added during the formulation or blending of the gum. Moisture content of the instant gum is less than 0.5% and typically less than 0.2% when made of crystalline sugar or crystalline sugar alcohols. When amorphous sugar, sugar alcohols and mixtures thereof are employed, their moisture content may be from about 1% to about 5%. In both cases the water activity of the resulting gum is between about 0.10 to about 0.30 and typically between about 0.15 to about 0.25. Preferably the difference between the water activity of the first component and the second component will be no greater than 0.05. Desirably the water activity of the gum component is lower than that of the carbonated candy component.

The carbonated candy component of the instant confection is conventionally produced according to the process of U.S. Pat. No. 3,012,893. In the preferred embodiment of this invention, the amorphous carbonated candy is produced such that it is substantially identical or substantially the same in appearance to the gum pieces. Thus sucrose based gum having a particle size that passes through 4 and is retained on 12 mesh U.S. Standard Sieves is combined with sucrose based amorphous carbonated candy whose particle size is controlled to also pass through 4 and be retained on 12 mesh. Both the gum and the candy may have the same color level and flavor. The moisture content of the candy is typically between 2.0% and 4.0%. Preferably the moisture content is between 2.8% and 3.3% by weight of the carbonated candy composition. At moisture levels above 4.0% of the candy composition becomes sticky and the entrapped gas escapes.

The candy and gum are combined together in a 1 to 1 ratio (by weight) and subsequently packaged in foiled lined water impervious pouches. Other embodiments of this invention contemplate gum to candy ratios of 1 to 10 to 10 to 1. The particle size of the gum may be larger or smaller than the carbonated candy.

Another embodiment of the instant invention is the candy is thoroughly mixed within the gum portion of the confection so that a portion or all of the carbonated candy is encapsulated within the chewing gum.

The exact ratio of gum to candy, the exact particle sizes employed, amounts of flavorants, colorants and process parameters during manufacture can be determined best by purpose-directed routine experimentation and taste testing as is well known in the art keeping within the limits set forth elsewhere in this specification. An important aspect of this invention is to combine a carbonated candy and gum in a sealed, moisture resistant environment which on storage retains a major amount of carbonation in the candy and a soft gum portion, both aspects essential to consumer satisfaction. Non-carbonated embodiments are also contemplated by mixing sized amorphous sucrose or sugar alcohol based candy with similarly sized gum component.

EXAMPLE ONE

I. Preparation of Bubble Gum with Crystaline Sugar

A. Formula

| 1. | Bubble gum base | 600g |
|---|---|---|
| 2. | Crystalline Sucrose 6X | 1372 |
| 3. | Lecithin | 4 |
| 4. | Vegetable Oil | 2 |
| 5. | Bubble Gum Flavor | 20 |
| 6. | Color | 2.25 |
|  | TOTAL | 2000.25g |

B. Mixing Procedure

The gum is prepared and mixed in a Baker Perkins type J Universal mixer size No. 4 with a working capacity of 0.7 gallons and a Sigma mixing blade. The mixer is provided with a steam jacket to maintain a desired temperature. First the temperature of the apparatus is brought to 63° C. and the gum base is inserted along with 10% of the sucrose and all of the color. The mixing is then commenced and after one minute the lecithin is added. After two minutes 23⅓% of the sucrose is added. After four minutes 33⅓% of the sucrose is added. After four minutes and 30 seconds the bubble gum flavor is added. After six minutes 33% of the sucrose is added. After seven minutes the vegetable oil is added. Mixing is allowed to continue for another three minutes during which time the temperature is reduced approximately 10° C. After a total of ten minutes mixing, the gum is ready for extrusion.

The warm gum is extruded into 3/16-inch diameter strands and cooled quickly to dry ice temperature (−78° C.). The strands are fractured by hammering, yielding pieces which are sieved in the range of minus 4, plus 12 (U.S. Standard Sieves). The sieved pieces are then warmed to room temperature in a vacuum dessicator in order to evaporate any moisture which condensed on them during the fracturing process. After about one hour, the bubblegum pieces are ready to be packaged with the carbonated candy. The water activity of this gum portion is 0.21.

II. Preparation of Carbonated Candy

A. Formula of Carbonated Candy (final product)

| 1. | Sucrose | 1225.190g |
|----|---------|-----------|
| 2. | Lactose | 695.06 |
| 3. | Water | 60.00 |
| 4. | Carbon Dioxide | 14.68 |
| 5. | Color | 0.274 |
| 7. | Bubble Gum Flavor | 4.896 |
|    | Total | 2000.00g |

Sucrose and lactose are mixed with water (500g) to form a slurry. The slurry is heated rapidly to 320° F. (160° C.) to remove 97% of the water and transferred to a pre-heated autoclave where the molten candy mass is injected with flavor, color, and carbon dioxide by rapid (600 rpm) stirring to disperse the gas bubbles. The gassified candy melt is cooled quickly to room temperature. The pressure is reduced to atmospheric, and the carbonated candy, which has been fractured by the pressure reduction, is sieved through a four-sieve and onto a twelve-sieve (U.S. Standard Sieves). The candy is then evaluated for carbonation quality and color; whereupon, it is ready to be mixed with the bubblegum. The water activity of this carbonated candy portion is 0.21.

III. Packaging

A. Formulation of Mixture

| 1. | Carbonated Candy, sieved | 4.0g |
|----|--------------------------|------|
| 2. | Crystalline Bubble Gum, sieved | 4.0 |
|    | Total net weight | 8.0g |

B. Packet Specification

| 1. | Height | 4¼ inch |
|----|--------|---------|
|    | Width | 2¾ inch |
| 2. | Basis Weight (less printing) | 93.7 lbs/3000 sq. ft. |
|    | Coated Pouch Paper | 30 lbs/3000 sq. ft. |
|    | Low Density Poly Laminant | 7 lbs/3000 sq. ft. |
|    | Bartuf 3® | 7.1 lbs/3000 sq. ft. |
|    | Low Density Poly Laminant | 7 lbs/3000 sq. ft. |
|    | Aluminum Foil | 14 lbs/3000 sq. ft. |
|    | Low Density Poly Laminant | 7 lbs/3000 sq. ft. |
|    | Low Density Poly Film | 21.6 lbs/3000 sq. ft. |
| 3. | Moisture Vapor Transmission | .02 gms/100 in.$^2$/24 hrs. |
| 4. | Heat seal pouch ends at 375° F. from one second at 40 psi. | |

EXAMPLE TWO

I. Preparation of Bubble Gum with Amorphous Sugar

A. Formula

| 1. | Bubble gum base | 600g |
|----|-----------------|------|
| 2. | Amorphous sugar (comprising sucrose and lactose) | 1372 |
| 3. | Lecithin | 4 |
| 4. | Vegetable oil | 2 |
| 5. | Bubble gum flavor | 20 |
| 6. | Color | 2.45 |
|    | TOTAL | 2000.45g |

B. Mixing Procedure

The gum is prepared and mixed in a Baker Perkins type J Universal mixer size No. 4 with a working capacity of 0.7 gallons and a Sigma mixing blade. The mixer is provided with a steam jacket to maintain a desired temperature. First the temperature of the apparatus is brought to 63° C. and the gum base is inserted along with 10% of the amorphous sugar and all of the color. The mixing is then commenced and after one minute the lecithin is added. After two minutes 23⅓% of the amorphous sugar is added. After four minutes 33⅓% of the amorphous sugar is added. After four minutes and 30 second the bubble gum flavor is added. After six minutes 33% of the amorphous sugar is added. After seven minutes the vegetable oil is added. Mixing is allowed to continue for another three minutes during which time the temperature is reduced approximately 10° C. After a total of ten minutes mixing, the gum is ready for extrusion.

The warm gum is extruded into 3/16-inch diameter strands and cooled quickly to dry ice temperature (−78° C.). The strands are fractured by hammering, yielding pieces which are sieved in the range of minus 4, plus 12 (U.S. Standard Sieves). The sieved pieces are then warmed to room temperature in a vacuum dessicator in order to evaporate any moisture which condensed on them during the fracturing process. After about one hour, the bubblegum pieces are ready to be packaged with the carbonated candy. The finished gum has a moisture content of 1.5% and an Aw of 0.21.

II. Preparation of Carbonated Candy

Same as EXAMPLE ONE

III. Packaging

A. Formulation of Mixture

| 1. | Carbonated candy, sieved | 4.0g |
|----|--------------------------|------|
| 2. | Amorphous Bubble Gum, sieved | 4.0 |
|    | Total net weight | 8.0g. |

B. Packet Specification

Same as EXAMPLE ONE

The candy and gum of both examples are mixed in the moisture resistant package to ensure than an even distribution of gum and candy is present. The effect of the carbonated candy is immediately evident to the consumer as he takes a handful of the product, while the bubblegum builds up in his mouth as more of the product is eaten. The product differs from carbonated candy alone because it has the long lasting benefits of bubblegum in addition to the short range effects of carbonated candy. The gum portion remains pliable and both components are storage stable for periods of time in excess of six weeks.

What is claimed is:

1. A confection comprised of at least two distinct components, having a water activity of about 0.10 to about 0.30, and being capable of surviving long periods of storage when packaged in a moisture resistant material, said confection comprising a first pliable bubble gum component having a moisture content of from about 0.10% to about 5.0% by weight of the gum component and a water activity of about 0.10 to about 0.30, and a second carbonated candy component containing from 0.05 to 15 milliliters of carbon dioxide in each gram of candy to provide a pop or sizzle upon being wetted upon eating, said candy having a moisture content of from about 1.0% to about 5.0% by weight of the carbonated candy component and a moisture activity of about 0.10 to about 0.30.

2. The confection of claim 1 wherein the water activity of both the gum component and the carbonated candy component are within the range of about 0.15 to about 0.25.

3. The confection of claim 2 wherein the difference between the water activity of the first component and the second component is no greater than 0.05.

4. The confection of claim 3 wherein the water activity of the first component is equal to or lower than the second component.

5. The confection of claim 1 wherein the chewing gum component comprises bubble gum base in amounts of at least 28% by weight of the total gum component, flavor and sweetener selected from the group consisting of sucrose, sugar alcohols, dextrose, fructose, glucose, synthetic sweeteners and mixtures thereof whereby the gum component is pliable at room temperatures.

6. The confection of claim 1 wherein the ratio of the first component to the second component is between 1:10 to 10:1 by weight.

7. The confection of claim 6 wherein the ratio of the first component to the second component is 1:1 by weight.

8. The confection of claim 1 wherein the first component and the second component both have a particle size between −4 and +12 mesh U.S. Standard Sieves.

9. The confection of claim 1 wherein the pliable bubble gum component is a sugar bubble gum.

* * * * *